United States Patent [19]

Kirby

[11] Patent Number: 4,692,054
[45] Date of Patent: Sep. 8, 1987

[54] CONNECTOR SYSTEM FOR STRUCTURAL FRAMEWORK

[75] Inventor: Charles A. Kirby, Gig Harbor, Wash.

[73] Assignee: Northwest Design Products, Inc., Tacoma, Wash.

[21] Appl. No.: 769,484

[22] Filed: Aug. 26, 1985

[51] Int. Cl.$^4$ .................... F16B 7/18; F04H 12/06
[52] U.S. Cl. .................... 403/171; 403/176; 403/296; 403/362; 52/648
[58] Field of Search .............. 403/171, 170, 176, 320, 403/296, 362; 52/648

[56] References Cited

U.S. PATENT DOCUMENTS

| 1,714,899 | 5/1929 | Butts | 403/320 |
| 2,212,455 | 8/1940 | Reed | 403/320 |
| 3,834,826 | 9/1974 | Simond | 403/409.1 |
| 3,980,408 | 9/1976 | Jachmann | 403/362 |
| 3,982,841 | 9/1976 | Endzweig | 403/171 |
| 4,313,687 | 2/1982 | Apeztegui et al. | 403/320 |
| 4,438,615 | 3/1984 | Wendel | 52/648 |

FOREIGN PATENT DOCUMENTS 0604934 4/1978 U.S.S.R. .................. 52/648

Primary Examiner—Cornelius J. Husar
Assistant Examiner—Peter M. Cuomo
Attorney, Agent, or Firm—Christensen, O'Connor, Johnson & Kindness

[57] ABSTRACT

Disclosed is a connector system for structural frameworks which comprises a strut element (14) having one end connected to the end of a beam member (16). The strut element (14) has an axial bore (26) with the head portion of a bolt (36) retained therein. The shank (40) of the bolt extends outwardly from the strut element for threaded engagement with a correspondingly threaded aperture of a dodecahedral node (12). A drive nut (42) is fixed to the shank of the bolt and used for rotating the bolt so that the shank is screwed into the node (12). A set screw (46) passes through the strut element (14) to impinge upon the head of the bolt thereby preventing rotation of the strut element with respect to the bolt. A hollow metal rod (54) extends through the end of the beam member (16) and aligned apertures (52) in the end of strut element (14). The ends of the rod are riveted to secure the strut element to the beam member.

11 Claims, 3 Drawing Figures

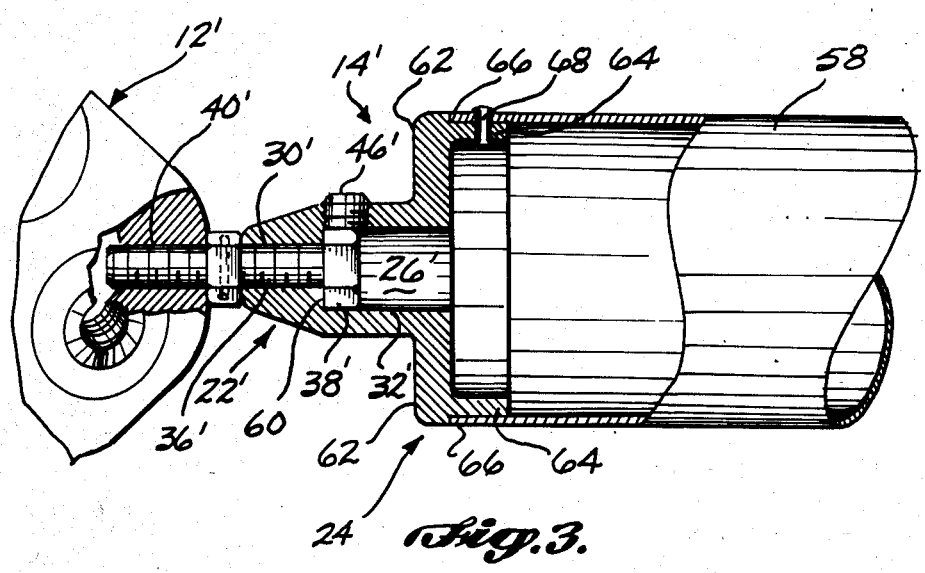

CONNECTOR SYSTEM FOR STRUCTURAL FRAMEWORK

BACKGROUND OF THE INVENTION

This invention relates to systems for connecting struts and nodes in a three-dimensional structural framework.

Certain three-dimensional structural frameworks employ a plurality of rods or struts arrayed in a particular geometric pattern with their ends connected together at joints or nodes.

A variety of methods for connecting the struts to the joints are known. One method is commonly known as the MERO system and is sold by Unistrut Corporation of Wayne, Mich. That system uses bolts that are slidably mounted within the ends of tubes, the projecting threaded ends of the bolts engaging a correspondingly threaded hole in the joint. Drive collars having a hexagonal-shaped outer surface slide over the projecting ends of the bolts. The drive collars have slots formed in a pair of opposing sides. The protruding ends of a pin that extend through the bolt are received in longitudinal slots that are formed in the drive collars. So configured, the drive collar is capable of rotating the bolt while being axially slidable along it, thereby providing a means for threading the bolt into the hole in the joint. Such a drive collar must be formed by special machining tools and is thus relatively expensive to manufacture.

While known systems have been found satisfactory for conventional structural applications, there is no provision in these systems for preventing rotation of the strut with respect to the bolt once it is connected. In the structural framework employed by applicant, the struts comprise, in part, cylindrical wooden and metal beam members, which are suitable for playground climbing. Hence, it is important that the beam members do not spin about their longitudinal axes while children are climbing upon them.

SUMMARY OF THE INVENTION

This invention is directed to a connector system for a structural framework that is relatively inexpensive to manufacture and provides a strut that is restrained against axial rotation when connected to a joint or node. The connector system formed in accordance with this invention comprises a strut element having a first end and a second end, the first end of the strut having a bore formed therein. The head of a bolt is retained within the bore while a portion of the shank of the bolt extends outwardly from the bore, the shank portion having threads formed thereon. A drive nut is fixed to the shank portion and is configured so that rotation of the drive nut causes corresponding rotation of the bolt. An antirotation device is attached to the first end of the strut element and is selectively engageable with the bolt for preventing rotation of the strut element with respect to the bolt. A substantially spherical node is engageable with the shank portion of the bolt. Rotation of the drive nut secures the strut element to the node.

BRIEF DESCRIPTION OF THE DRAWINGS

FIG. 3 is a partial sectional view of an alternative embodiment of the connector system of the present invention.

DETAILED DESCRIPTION OF THE PREFERRED EMBODIMENT

Figure 1:
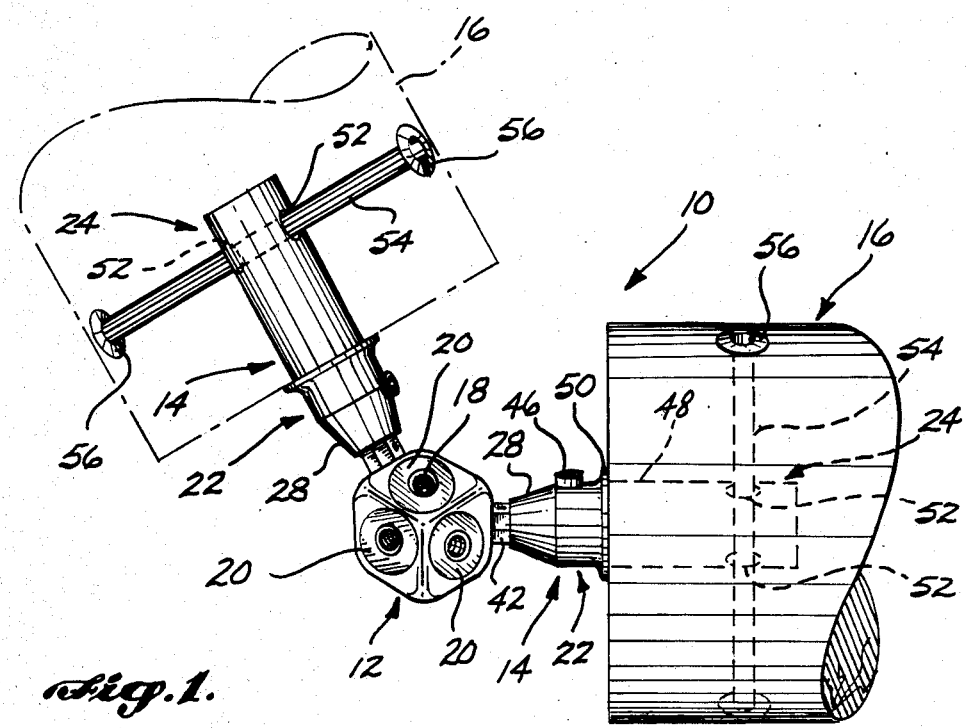
FIG. 1 is a side view of the connector system constructed in accordance with the invention.

Referring to FIG. 1, the connector system 10 for a structural framework constructed in accordance with this invention includes node 12 in the general shape of a dodecahedron with rounded edges and corners and a strut element 14 having one end secured to the node and the other end embedded within a wooden beam member 16. A plurality of threaded apertures 18 extend radially into node 12 in the central portion of each of the planar, annular faces 20 on the outer surface of node 12.

The strut element 14 is substantially tubular in configuration having a tapered end 22 and an open end 24. The outer part of the tapered end 22 of the strut element 14 is tapered toward the strut axis, rendering that part of the strut element 14 substantially frustum-shaped. An axial stepped bore 26 extends through the strut element 14. The bore 26 is comprised of a first diameter section 30 extending into the outermost part of the first end 22 of the strut element 14 to a point intermediate the first end 22 and the second end 24 of the strut element 14, and a second diameter section 32 extending from the intermediate point to the second end 24 of the strut element 14. The diameter of the first diameter section 30 is smaller than the diameter of the second diameter section 32. At the point where the first and second diameter sections meet, an annular shoulder 34 is formed within the bore 26.

A bolt 36 is partially located within stepped bore 26. The bolt 36 is positioned so that its hexagonal head 38 abuts the shoulder 34 within the bore. The diameter of the head 38 is sized so that it falls between the diameters of the first and second diameter sections 30 and 32, respectively. The threaded shank 40 of the bolt extends outwardly from the first end of the strut element 14 and is threaded into any selected aperture 18 of node 12.

A drive nut 42 is positioned on the shank 40 between node 12 and the outermost end of strut element 14. The drive nut 42 is fixed to the bolt by any suitable means such as a pin 44 which passes through nut 42 and the shank 40 of the bolt. Rotation of the drive nut 42 by suitable means, such as an adjustable wrench, causes rotation of the bolt thereby screwing the threaded shank into the selected threaded aperture 18 until the drive nut is tightly seated against the planar annular face 20 associated with the selected aperture.

Figure 2:
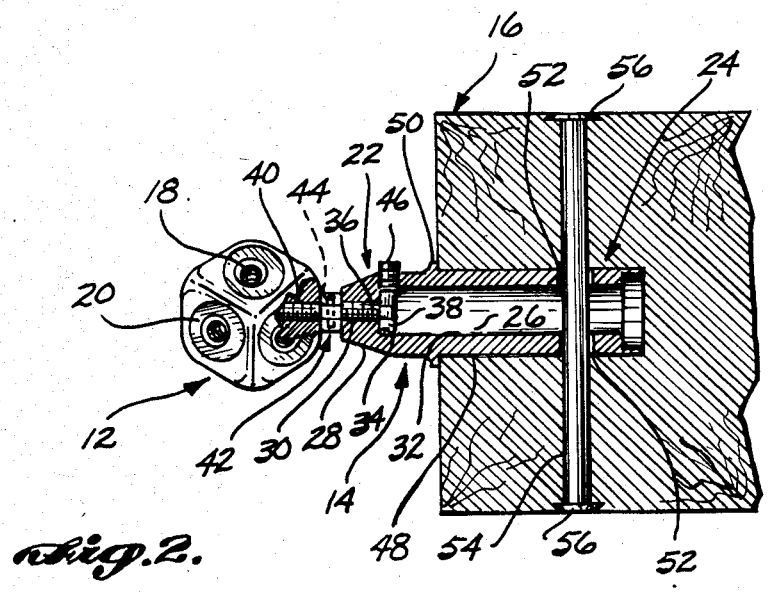
FIG. 2 is a partial sectional view of the connector system of FIG. 1.

A set screw 46 is threaded through the strut element 14 at a location along the strut element at which the set screw is aligned with the head 38 of the bolt 36. Once the drive nut is seated against planar face 20 as described, the set screw can be screwed toward the bolt to bear against one of the sides of the hexagonal head 38 (this position of the set screw is shown in FIG. 2). Set screw 46 thereby keeps the strut element 14 from rotating with respect to the bolt 36.

The open end 24 of strut element 14 is inserted into a bore 48 formed in the end of wooden beam member 16. When properly inserted, a circumferentially extending flange 50, which is integrally formed with the strut element 14, is positioned to bear upon the face part of the beam member 16 that surrounds hole 48.

Two diametrically-opposed apertures 52 are drilled in the second end of strut element 14, their central axis being normal to that of bore 26. A hollow metal rod 54 having roughly the same outside diameter as apertures 52 passes through a diametral bore in the beam number 16. Each end of the rod 54 is riveted to form flanges 56 that are countersunk into the wooden beam member 16, thereby securing the tube 54, and hence the strut element 14, to the wooden beam member.

Referring to FIG. 3, a strut element 14' that is modified for connection with a tubular metal beam member 58 is illustrated. In this alternative embodiment, the strut element 14' has a tapered end 22' and an open end 24'. An axial stepped bore 26' extends through the strut element. The bore 26' comprises a first-diameter section 30' extending into the outermost part of the tapered end 22' of the strut element 14' to a point intermediate the tapered and open end of the strut element 14', and a second diameter section 32' extending from the intermediate point of the second end 24' of the strut element 14'. The diameter of the first diameter section 30' is smaller than the diameter of the second diameter section 32'. At the point where the first and second diameter sections meet, an annular shoulder 60 is formed within bore 26'.

A bolt 36 resides partially within stepped bore 26'. The bolt 36' is positioned so that its hexagonal head 38' abuts the shoulder 60 within the axial bore 26'. The diameter of the head 38' of the bolt 36' is sized slightly less than the diameter of the second diameter section 32'. The shank 40' of the bolt is connected to the node 12' in the same manner as earlier described with regard to the preferred embodiment. Furthermore, a set screw 46' is threaded through the tapered end 22' of the strut element 14' at a location along a strut element wherein the set screw is aligned with the head 38' of the bolt 36'. As noted in the earlier-described embodiment, the set screw is screwed inwardly toward the bolt to bear against one of the sides of the hexagonal head 38' in order to keep the strut element 14' from rotating with respect to the bolt 36'.

The open end 24' of strut element 14' comprises a flange portion 62 that extends radially from the longitudinal axis of the strut element 14' such that its outermost diameter is approximately the same as the diameter of the metal beam member 58.

An annular projection 64 is formed in the outer edge of the flange portion 62 extending normal thereto in a direction away from the tapered end 22' of the strut element 14'. The annular projection 64 is sized to snugly fit within the tubular metal beam member 58. The end 66 of the metal beam member 58 abuts against the edge of the flange portion 62 that extends radially beyond the annular projection 64. A rivet 68 extends radially through overlapping portions of the metal beam member 58 and the strut element 14' to secure the two elements together. Alternatively, metal beam member 58 and flange portion 62 could be welded together.

While the invention has been described with reference to a preferred embodiment, it is to be clearly understood by those skilled in the art that the invention is not limited thereto. Rather, the scope of the invention is to be interpreted only in conjunction with the appended claims.

The embodiments of the invention in which an exclusive property or privilege is claimed are defined as follows:

1. A connector system for structural frameworks comprising:
   (a) a strut element having a first end portion and a second end, portion the first end of the strut element having a longitudinal bore therein;
   (b) a bolt member having a head and shank, said bolt member beng mounted within said longitudinal bore, the head of the bolt member being retained within the bore and a portion of the shank of the bolt member extending outwardly from the bore, the shank portion having a plurality of threads formed thereon;
   (c) a drive nut fixed about the shank portion and being immovable relative to the shank portion, the drive nut being configured so that rotation of the drive nut causes corresponding rotation of the bolt member; and
   (d) antirotation means secured to the first end portion of the strut element and being selectively engageable with the bolt member for preventing rotation of the strut element relative to the bolt member.

2. The system of claim 1 further comprising a beam member, the beam member having a bore configured to receive the second end portion of the strut element.

3. The system of claim 2 further comprising at least one aperture formed in the second end portion of the strut element and at least one corresponding aperture formed in the beam member; and, fastening means extending through the aperture in the strut element and the corresponding aperture in the beam member for fastening the strut element to the beam member.

4. The system of claim 1 wherein the antirotation means comprises a set screw threaded into the strut element, the set screw being aligned with the head of the bolt member, the inner end of the set screw bearing against the head of the bolt member when the set screw is screwed inwardly, the head of the bolt member being configured so that rotation of the strut element with respect to the bolt member is prevented when the set screw impinges thereupon.

5. The system of claim 1 wherein the drive nut includes pin means extending through the nut and shank portion for fixing the position of the nut relative to the shank portion.

6. The system of claim 1 wherein the bore is stepped and has at least two sections of different diameter, the head of the bolt member being sized to pass through one section but not the other.

7. The system of claim 2 wherein the strut element and the beam member are welded together.

8. The system of claim 3 wherein the fastening means is a rivet.

9. The system of claim 3 wherein the fastening means is a rod-like member having ends riveted to the beam member, the rod-like member extending completely through the beam member.

10. The system of claim 2 further comprising a circumferential flange formed in the strut element, the outermost diameter of the flange being greater than the diameter of the bore in the beam member.

11. The system of claim 1 further including a node, the node being engageble with the shank portion such that rotation of the drive nut secures the strut element to the node.

* * * * *

UNITED STATES PATENT AND TRADEMARK OFFICE
CERTIFICATE OF CORRECTION

PATENT NO. : 4,692,054
DATED : September 8, 1987
INVENTOR(S) : Charles A. Kirby

It is certified that error appears in the above-identified patent and that said Letters Patent is hereby corrected as shown below:

Column 4, line 4, delete "," (comma) after "end"

Column 4, line 4, insert "," (comma) after "portion"

Column 4, line 4, insert --portion-- after "end"

Signed and Sealed this

First Day of March, 1988

Attest:

DONALD J. QUIGG

*Attesting Officer*     *Commissioner of Patents and Trademarks*